United States Patent [19]

Parker

[11] 4,062,413
[45] Dec. 13, 1977

[54] FEEDER UNIT AND METHOD FOR USE IN A WEIGHING SYSTEM

[75] Inventor: Michael S. Parker, Monroe, La.

[73] Assignee: Olinkraft, Inc., West Monroe, La.

[21] Appl. No.: 693,460

[22] Filed: June 7, 1976

[51] Int. Cl.² ............................................. G01G 13/08
[52] U.S. Cl. .................................... 177/122; 198/446
[58] Field of Search ............... 177/122, 123, DIG. 11, 177/63, 64, 1; 198/442, 446, 448

[56] References Cited

U.S. PATENT DOCUMENTS

| | | | |
|---|---|---|---|
| 3,416,619 | 12/1968 | McClusky | 177/123 X |
| 3,540,538 | 11/1970 | Connors | 177/122 |

Primary Examiner—Joseph W. Hartary
Attorney, Agent, or Firm—Norvell E. Von Behren

[57] ABSTRACT

An improved feeder unit and method for use in a weighing system is disclosed wherein a bulk and a dribble feeder are positioned in close proximity to each other with both feeders being vibratory feeders. Positioned over the vibratory dribble feeder is a movable wiper blade which is utilized for wiping a portion of the bulk objects from the dribble feeder into the bulk feeder with the movable wiper blade allowing a controlled portion of the bulk objects to remain on the dribble feeder. The controlled movement of the wiper is utilized to allow a predetermined amount of the bulk objects being fed by the dribble feeder to pass under the wiper without jamming between the wiper and the dribble feeder thereby providing a much improved feeder unit. Also disclosed is a method for controlling the flow of bulk objects on a dribble feeder and for reducing jamming of the bulk objects on the dribble feeder which comprises the steps of providing and positioning a wiper over the dribble feeder to wipe a pre-determined amount of bulk objects away from the dribble feeder and allowing the wiper to move a controlled predetermined amount in order to prevent jamming of the bulk objects remaining on the dribble feeder from beneath the wiper thereby resulting in a much improved control of the flow of bulk objects.

9 Claims, 8 Drawing Figures

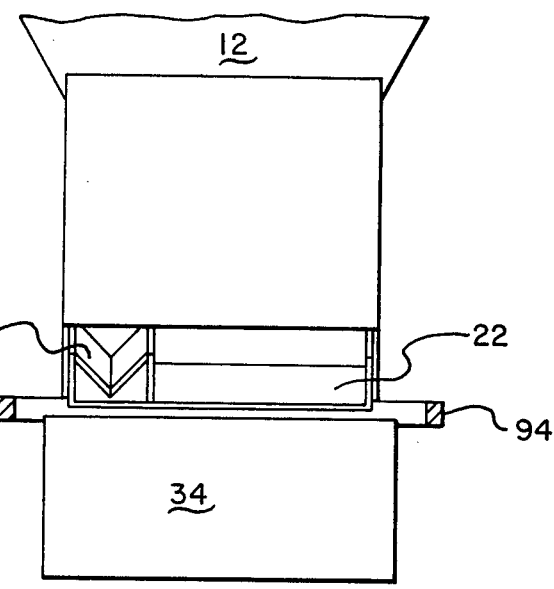
FIG. 4
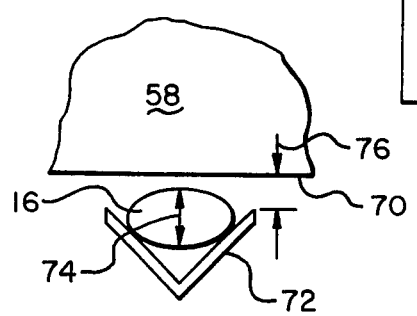
FIG. 6
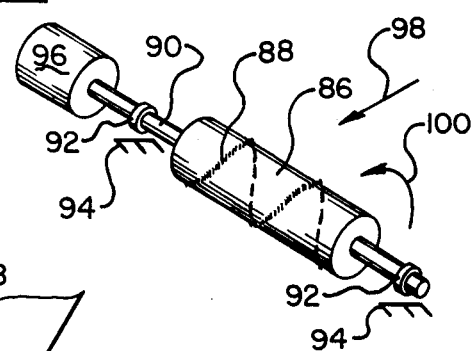
FIG. 8
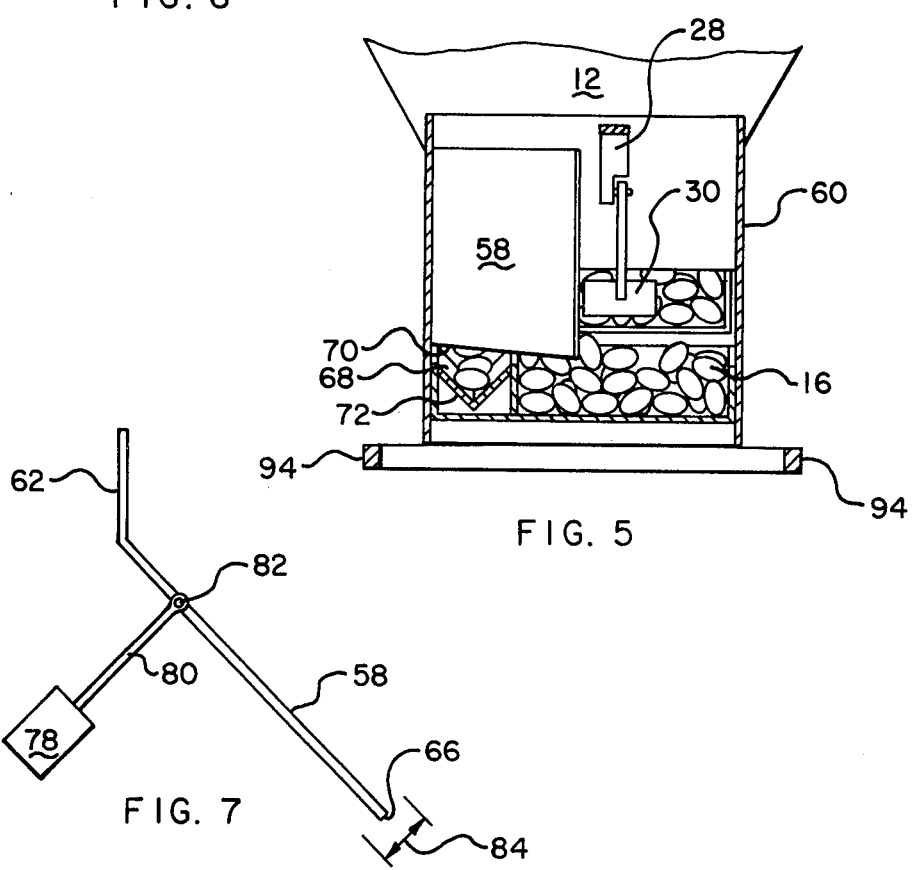
FIG. 5
FIG. 7

FEEDER UNIT AND METHOD FOR USE IN A WEIGHING SYSTEM

BACKGROUND OF THE INVENTION

This invention relates generally to feeder units for use in weighing systems and more specifically relates to a new and novel flow control system and method for single briquette delivery to a weighing device to secure accuracy in weighing of the charge in the system.

In the weighing of commodities, it is a customary practice to use a sensitive weight sensing unit in combination with a product delivery system that provides a uniform flow rate. The final weight is anticipated in the cut off of product flow and because the flow is uniform, the desired accurate weights can be secured. This has not been true in weighing briquettes such as charcoal, sugar or the like. For example, the most accurate weighing of granular sugar would be plus or minus one grain of sugar which is commercially not possible nor economically feasible since the briquette weighing one ounce is the smallest particle being weighed. The most accurate weighing at plus or minus one briquette is economically desirable and heretofore has not been possible with prior art weighing systems.

Most weighing systems of the prior art designs employ a two-stage product delivery with a bulk delivery feeder being utilized for 90 to 95 percent of the weight desired and a fine or dribble feeder being utilized for the final 5 to 10 percent of the desired weight in order to attain the desired accuracy.

In the control of the fine or dribble feed of the system, a level control has been utilized to restrain the flow of excess briquettes in the dribble feeder tray. It is known in the art to use fixed wiper plates at right angles to and across the flow path to restrain the flow of briquettes and provide a desirable level of briquettes in the dribble tray. The prior art level controls were generally fixed or vertically adjustable at some desired position over the dribble feeder tray at right angles to the flow and this arrangement may have been modified by one of rubber or some other flexible material or skirt on the bottom of the wiper plates in an attempt to prevent wedging of the objects beneath and behind the wiper plates. When such wedging occurred, the bulk object had no place to go, and the entire system had to be shut down in order to free the jammed bulk object from beneath the door in order to continue the weighing and packaging of the commodity. Such jamming and stopping of the system resulted in costly downtimes and extremely slow packaging speeds. The applicant's new and novel invention is directed primarily to the elimination of the jamming in the dribble feeder portion of a weighing system.

SUMMARY OF THE INVENTION

In order to overcome the difficulties and problems inherent in the prior art devices, there is provided by the subject invention a new and novel feeder unit for use in a weighing system which comprises a vibratory bulk feeder being positioned in close proximity to a vibratory dribble feeder with a movable wiper being mounted over the dribble feeder for wiping a portion of the bulk objects from the dribble feeder into the bulk feeder. The movability of the wiper allows a controlled portion of the bulk objects to remain on the dribble feeder and prevents the jamming of the bulk objects between the bottom portion of the wiper and the dribble feeder thereby allowing for a continuous operation of the feeder unit without shutdown as was heretofore required.

Accordingly, it is an object and advantage of the invention to provide an improved feeder unit for use in a weighing system which provides a movable wiper mounted over the dribble feeder with the movement of the wiper eliminating jamming of bulk objects such as briquettes from beneath the wiper and within the dribble feeder.

Another object and advantage of the invention is to provide a new and novel feeder unit for use in a weighing system which provides a movable wiper mounted over the dribble feeder with means being provided by the invention for controlling the movement of the wiper during use of the feeder unit.

Yet another object and advantage of the invention is to provide a new and novel feeder unit for use in a weighing system which utilizes a vibrator fixedly attached to a movable wiper positioned over the dribble feeder for vibrating the wiper to aid in preventing jamming between the wiper and the dribble feeder.

Still yet another object and advantage of the invention is to provide a new and novel feeder unit for use in a weighing system which utilizes a motor rotatably mounted to a movable wiper with the wiper being formed as a spiral wound brush which is rotatably mounted so that the motor controls the movement of the brush which aids in preventing jamming between the wiper and the dribble feeder.

A further object and advantage of the invention is to provide a new and novel method for controlling the flow of bulk objects on a dribble feeder of a weighing system and for reducing the jamming of bulk objects on the dribble feeder by providing and positioning a wiper over the dribble feeder and by further allowing the wiper to move a controlled predetermined amount in order to prevent jamming of the bulk objects underneath the wiper.

These and other objects and advantages of the invention will become apparent from a review of the preferred embodiment and claims following hereinafter and from a study of the drawings of the subject application.

BRIEF DESCRIPTION OF THE DRAWINGS

FIG. 4 is an end view, taken along line 4—4 of FIG. 2, showing the relative position of the bulk feeder and the dribble feeder;

FIG. 5 is a sectional view, taken along line 5—5 of FIG. 3, showing the relative position of the bulk objects in the bulk and dribble feeder and also showing the position of the movable wiper mounted above the dribble feeder;

FIG. 6 is an enlarged partial section of the left portion of FIG. 4 looking at the end of the V-trough dribble conveyor and showing the clearance over the conveyor to the wiper;

FIG. 7 is a plan view in diagramatic form showing a modification of the wiper to provide means for controlling the movement of the wiper; and FIG. 8 is another plan view in diagramatic form showing another modification of the wiper.

DESCRIPTION OF THE PREFERRED EMBODIMENT

Figure 1:
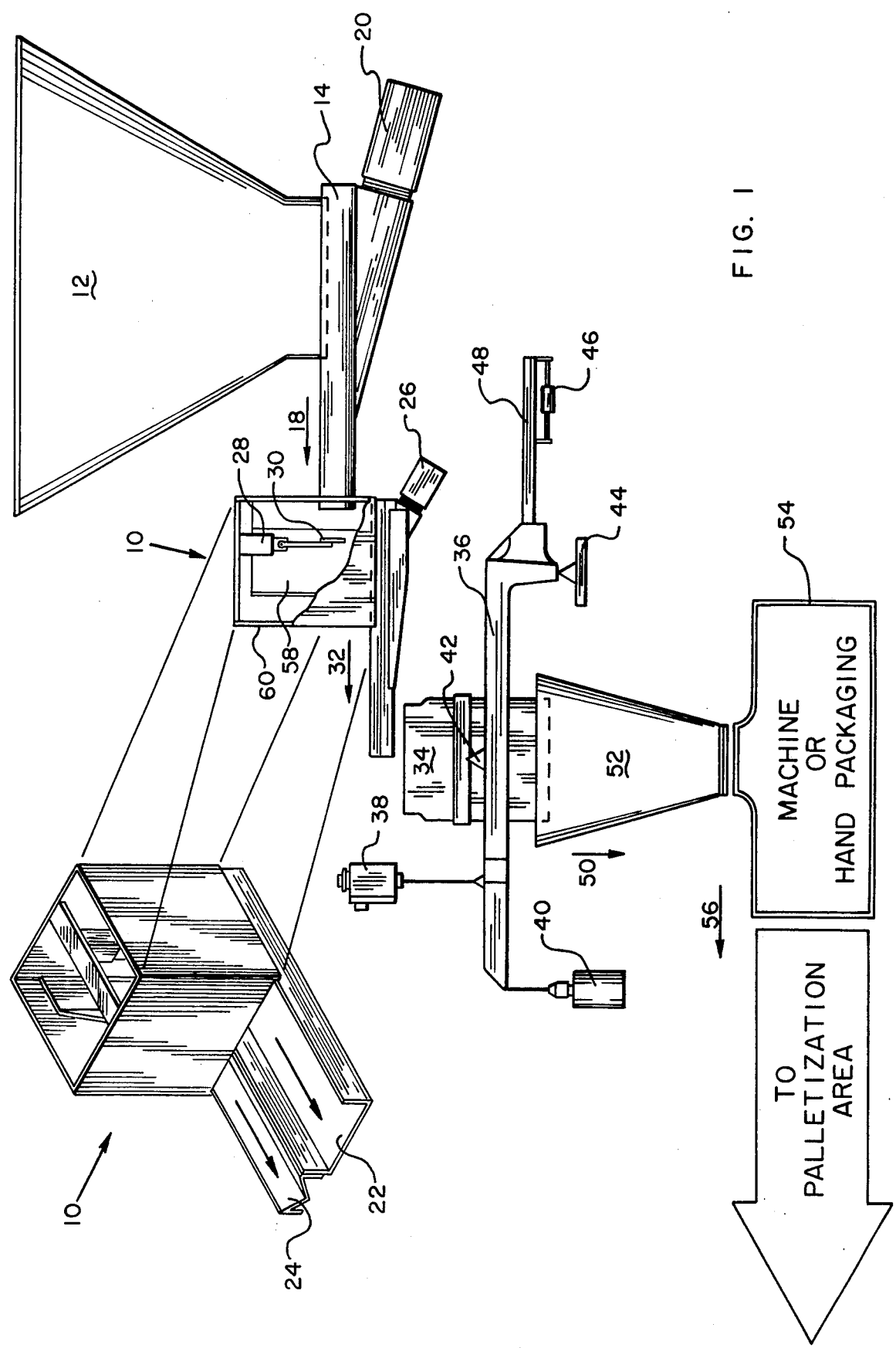
FIG. 1 is a side view showing the weighing system utilizing the improved feeder unit of the subject invention, with the feeder unit shown in isometric.
Figure 3:
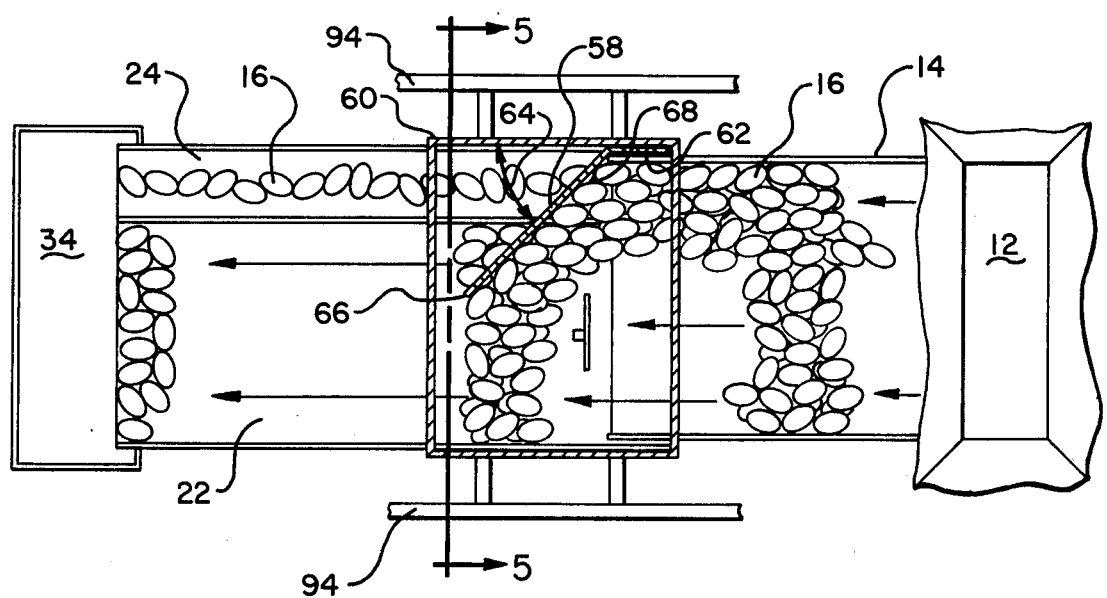
FIG. 3 is a top view, taken along line 3—3 of FIG. 2, showing the positioning of the bulk feeder and the dribble feeder and the positioning of the movable wiper blade mounted above the dribble feeder.

Referring now to the drawings in general and in particular to FIG. 1 of the drawing, there is shown a side view of the subject weighing system which utilizes the new and novel feeder unit shown generally by the numeral 10. The weighing system utilizing the new and novel feeder unit 10 comprises generally a surge bin 12 which is positioned above a primary feeder 14 and is sized and designed to contain a plurality of bulk objects 16, as shown in FIG. 3, such as charcoal briquettes, granular sugar, or other similar objects in briquette form. The primary feeder 14 is generally a vibratory feeder with the bulk objects 16 being vibrated and moved in the direction shown by the arrow 18 by means of the vibrating motor 20 fixedly attached to the primary feeder 14.

After the bulk objects or briquettes leave the primary feeder 14, they are transferred to the feeder unit 10 which generally comprises two separate feeder units positioned in close proximity to each other and generally being designated in the trade as a bulk feeder 22 and a dribble feeder 24. The bulk feeder 22 is generally formed in a U-shaped pan configuration and is designed to handle 90 to 94 percent of the bulk weight desired to be weighed and ultimately packaged while the dribble feeder 24 is generally formed in a V-shaped trough configuration and is designed to handle the fine or dribble feed from the unit of the remaining 5 to 10 percent of the weight of the briquettes. The bulk feeder 22 is a vibratory feeder and is vibrated by means of the vibrating motor 26 while the dribble feeder 24 is also a vibratory feeder and is vibrated by its own vibrating motor not shown in the drawings but positioned behind the vibrating motor 26 as viewed in FIG. 1.

Positioned within the feeder unit 10 is a primary feeder control switch 28 which is an on/off control switch which is designed to keep a head in the primary feeder 14 by means of the actuating paddle 30. It is desirable to keep a buildup of the briquettes in the primary feeder 14 in order to obtain a smooth flow in the weighing system. As the briquettes pass through the feeder unit 10, they are being moved in the direction shown by the arrow 32 and pass into a weigh hopper 34 which is carried by a pair of weighing beams 36 connected to a load cell 38 and a dashpot 40. The weigh beams 36 carry the weigh hopper 34 by means of the pivot points 42 and are in turn positioned on pivot points 44 and are counterweighted by means of the counterweight 46 carried by the arm 48 fixedly attached to the weigh beams 36.

After being weighed in the weigh hopper 34, by means well known in the art and forming no portion of this invention, the bulk briquettes then pass downwardly, as shown by the arrow 50, into a hopper 52 where they are ultimately packaged into bags or some other container by means of the packaging machine 54 or by hand packaging to be then passed to the palletizing area in the direction of the arrow 56 where the package is ultimately assembled, palletized, and shipped to the customer.

Figure 2:
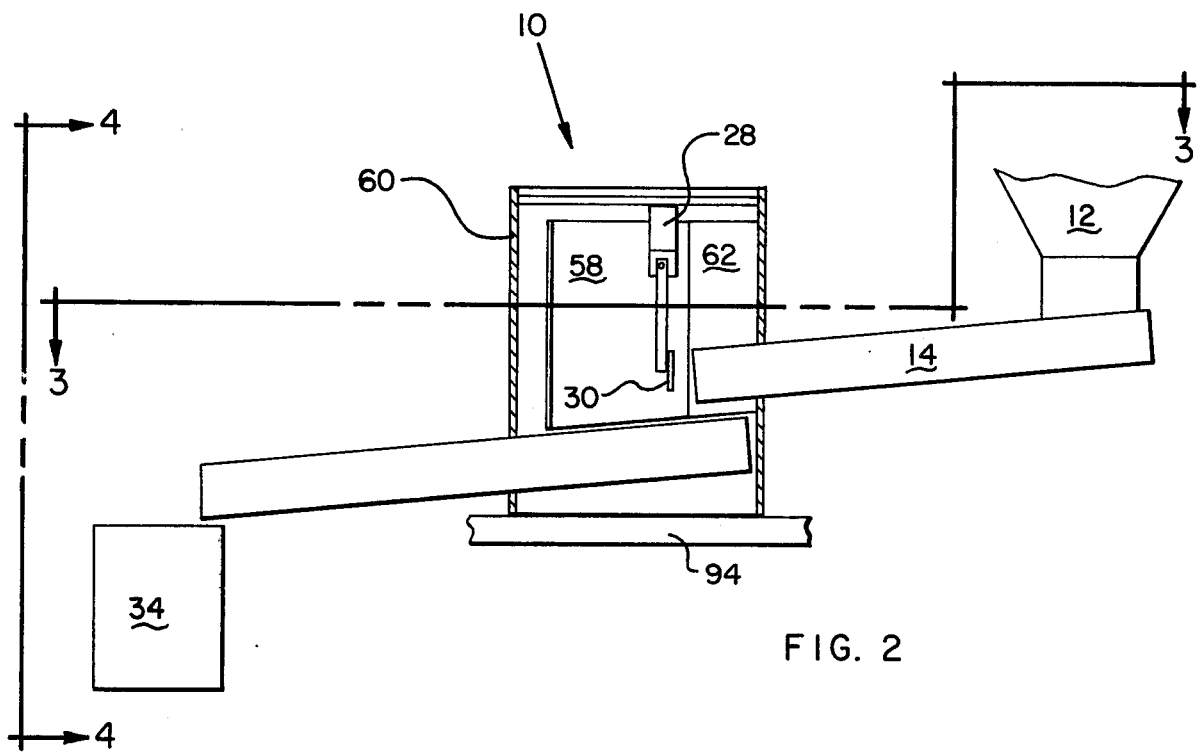
FIG. 2 is a side view of the improved feeder unit shown in FIG. 1 of the drawing and showing the feeder unit partially in section to show the relationship of the primary feeder to the bulk and dribble feeder which will be described more fully hereinafter.

Referring now to FIGS. 2 and 3 of the drawing, there will be described more in detail the new and novel movable wiper portion of the subject feeder unit 10 and how it functions to prevent jamming of the bulk objects on the dribble feeder 24 as the objects are vibrated on the feeder. As has been before described, the primary feeder level control switch 28 is utilized to keep a controlled buildup of briquettes in the primary feeder 14 as shown in FIG. 3 by the drawing whereupon the briquettes drop a short distance to the bulk feeder 22 and the dribble feeder 24. At this point it is necessary to remove a portion of the briquettes from the top of the dribble feeder 24 so that the dribble feeder will only vibrate one briquette at a time throughout the length of the feeder. In order to do this, there has been provided above the dribble feeder, a movable wiper 58 which is positioned above the V-shaped trough of the dribble feeder and above a portion of the bulk feeder and serves to wipe a portion of the briquettes from the dribble feeder into the bulk feeder 22. The wiper 58 is fixedly attached to the feed box 60 by means of the bent portion 62 which is welded or rigidly attached by other means to the sides of the feed box 60. When formed in this configuration, the wiper 58 would generally be positioned over the dribble feeder 24 at an angle of approximately 45° as shown by the arrow 64 and would be sufficiently flexible to allow it to move approximately three-sixteenths to one-fourth inch at its extreme tip 66. This movement results from the fact that the wiper 58 would be designed so that the desired movement is incorporated into the wiper by the cantilevered flexing of the wiper since the bulk objects 16 striking the wiper 58 would tend to move the wiper upon impact. This movement of the wiper 58 has been found to be sufficient to jog or reposition the bulk objects 16 so that they do not jam in the area 68 beneath the bottom 70 of the wiper 58 and the V-trough 72 of the dribble feeder 24. It has been found from experimentation that the area 68 is a critical area and in many cases the bulk objects 16 are not uniform in size and can be disoriented or misaligned as they are vibrated in the V-trough 72 prior to entering the V-trough.

Referring now to FIGS. 4, 5 and 6 of the drawing there is shown in more detail the placement of the wiper 58 over the dribble feeder 24 and in particular the V-shaped trough 72 of the dribble feeder 24 and how the placement of the wiper 58 is somewhat critical depending upon the type of bulk objects being fed by the feeder. For example, in FIG. 6 of the drawing there is shown in somewhat enlarged detail a bulk object 16 in the form of a charcoal briquette which is generally vibrated by the dribble feeder 24 in such a manner that the charcoal briquette generally will assume the position shown in FIG. 6 of the drawing laying somewhat on its side between the V-shaped trough 72. Whenever the briquette is generally formed of a thickness as shown by the arrow distance 74 of the drawing, it has been found preferable that the spacing of the bottom 70 of the wiper 58 is such that the bottom 70 should be placed approximately 1½ times the thickness or distance as shown by the arrow 74. That is to say that the bottom 70 should be spaced as shown by the arrow 76, a distance over the top of the V-trough 72 of 1½ times the briquette thickness. When spaced in this manner, it has been found that the wiper 58 is able to function in a more efficient and controlled manner and the jamming of the briquettes beneath the wiper 58 is virtually eliminated.

It has also been found from experimentation that the positioning of the bottom 70 over the top of the V-trough 72 as shown by the arrow distance 76 is preferably in the range of three-fourths inch to one inch and may in some circumstances be preferably in the range of one-half inch to one inch depending upon the type of bulk object 16 and its size and the size and depth of the V-trough 72.

Referring now to FIGS. 7 and 8 of the drawing there is shown in somewhat diagrammatic form, means for controlling the movement of the wiper 58 whenever it is desired to have a more positive means for controlling the movement other than utilizing the cantilevered effect of the elongated wiper 58 and its being moved by the impact motion of the bulk objects 16 as they strike the wiper that has been hereinbefore described. For example, in FIG. 7 a more positive means of movement may be constructed in the form of a vibrator 78 which is fixedly attached to the wiper 58 by means of the vibrator arm 80 attached to the wiper 58 by means of the pin 82. The vibrator 78 would be controlled by external means and would preferably be an electric vibrator of the type well known in the vibrating art. When utilized thusly, the vibrator 78 would be able to give a positive control of the motion of the tip 66 of the wiper 58 and would be able to control to a desired degree of movement or vibration as shown by the arrow 84 in FIG. 7. When utilized thusly, the tip 66 could be rigidly controlled to vibrate within the range of three-sixteenths inch to one-fourth inch which has been found to be desirable for certain types of bulk objects 16 and the tip 66 and the entire wiper 58 could be designed to vibrate to other controlled distances within the spirit and scope of the invention. When vibrating or moving thusly, it can be seen that the wiper 58 will serve to jog or reposition the bulk objects 16 that may build up in the area 68 of the dribble feeder 24 to aid in preventing jamming between the wiper 58 and the dribble feeder 24 at the top of the V-trough 72 thereby allowing the operator of the weighing system to have longer periods of running time than has been heretofore possible with prior art fixed non-moving wiper blades.

Whenever it is desired to have other positive types of means for controlling the movement of the wiper during operation of the feeder unit, it may be desirable to form the wiper as shown in FIG. 8 of the drawing. In that embodiment, the wiper 58 is formed as an elongated cylinder 86 having a spiral wound brush or series of brushes 88 fixedly attached thereto by means well known in the art of brushing. The cylinder 86 would be rotatably mounted, by means of the shaft 90 in a pair of bearings 92 carried by the frame 94 of the feeder unit 10 and would be rotatably driven by means of the motor 96 so that whenever the flow of bulk objects 16 is in the direction shown by the arrow 98, the rotation of the cylinder 86 would be upwardly and towards the oncoming flow of bulk objects as shown by the arrow 100. When positioned and rotated thusly, it can be seen that the wiper 58 in the form of the elongated cylinder 86 with spiral mounted brushes 88 attached thereto, would serve to redistribute and reposition the majority of the bulk objects 16 in the area 68 so that they can be either released one at a time to pass onto the dribble feeder 24 through the V-trough 72 and underneath the bottom 70 of the wiper or they would ultimately be repositioned onto the bulk feeder 22 in a manner similar to that shown in FIG. 3 of the drawing.

Whenever the more positive means for controlling the movement of the wiper 58 is designed in the configuration shown in FIG. 7 of the drawing or in FIG. 8 of the drawing, it should be noted that the wiper 58 or cylinder 86 would be positioned approximately at a 45° angle to the flow of the bulk objects 16 as shown in FIG. 3 of the drawing by the arrow 64, and the bottom of the wiper would be positioned at the desired controlled position above the V-trough 72 as has been heretofore described and especially as shown in FIG. 6 of the drawings.

In utilization of the method of the subject invention, the control of the flow of bulk objects on the dribble feeder and the reduction of the jamming of the bulk objects on the dribble feeder beneath the wiper is provided by the steps of providing and positioning a wiper over the dribble feeder a predetermined amount for wiping a portion of the bulk objects away from the dribble feeder with the wiper allowing a portion of the bulk objects to remain on the dribble feeder and the step of allowing the wiper to move a controlled predetermined amount in order to prevent jamming of the bulk objects underneath the wiper. The controlled movement of the wiper may be accomplished in the method by utilization of the springing characteristics of the cantilevered metallic wiper as described in the preferred embodiment herein or may be obtained by the use of a vibrator mounted to a similarly constructed steel wiper and may also be obtained by the use of a motor operated elongated cylinder having spirally mounted brushes attached thereto. It should also be noted that other means of providing for positive movement of the wiper 58 over the dribble feeder 24 may be obtained within the spirit and scope of the invention, and the subject invention is not to be limited to the embodiments shown.

From the foregoing it can be seen that there has been provided by the subject invention a new and novel feeder unit which greatly improves the flow of bulk objects such as briquettes in the dribble feeder portion of a vibrating feeder system and which results in the reduction of costly downtimes caused by jamming of the odd-shaped briquettes beneath the wiper blade positioned above the V-trough of the dribble feeder. It should be apparent that many changes may be made in the structure of the new and novel feeder unit and in the steps of the method hereinbefore described without departing from the spirit and scope of the invention, and the subject invention is not to be limited to the preferred embodiments shown and described and to the modifications shown and described which were given by way of illustration only.

Having described my invention, I claim:

1. An improved feeder unit for use in a weighing system, comprising:
   a. a frame;
   b. a vibratory bulk feeder fixedly attached to said frame for moving a large plurality of bulk objects along the bulk feeder;
   c. a vibratory dribble feeder fixedly attached to said frame for moving a smaller plurality of bulk objects along the dribble feeder, said dribble feeder being positioned in close proximity to said bulk feeder; and
   d. an independently movable flexible cantilevered wiper mounted on said frame, and positioned above said dribble feeder for wiping a portion of the bulk objects from said dribble feeder into said bulk feeder, said independently movable wiper allowing a controlled portion of the bulk objects to remain on said dribble feeder, said independently movable wiper being movable an independent predetermined amount in order to prevent jamming between said wiper and said dribble feeder, of the bulk objects that are to be left on said dribble feeder, said wiper also being vibrated independently by the vibratory feeder.

2. The feeder unit as defined in claim 1 further comprising:

e. means, associated with said wiper for controlling the movement of said wiper during use of the feeder unit.

3. The feeder unit as defined in claim 2 wherein said control means comprises a vibrator fixedly attached to said wiper for vibrating said wiper a predetermined amount to aid in preventing jamming between said wiper and said dribble feeder of the bulk objects that are to be left on said dribble feeder.

4. The feeder unit as defined in claim 1 wherein said wiper is formed as a rectangular shaped blade and is mounted above said dribble feeder at approximately 45° relative to the transverse axis of the dribble feeder and further comprising said wiper blade being movable across the path of the dribble feeder approximately in the range of three-sixteenths of an inch to one-fourth of an inch as the wiper blade deflects.

5. The feeder unit as defined in claim 1 wherein said wiper is mounted and positioned above said dribble feeder so that the lower edge of said wiper is spaced at a distance above said dribble feeder of approximately $\frac{3}{4}$ to 1.

6. The feeder unit as defined in claim 1 wherein said wiper is mounted and positioned above said dribble feeder so that the lower edge of said wiper is spaced at a distance above said dribble feeder of approximately $\frac{1}{2}$ to 1.

7. The feeder unit as defined in claim 1 wherein said wiper is mounted and positioned above said dribble feeder so that the lower edge of said wiper is spaced a predetermined distance above the objects being wiped by said wiper, said predetermined distance being approximately 1$\frac{1}{4}$ times the height of the objects measured from the base of the objects.

8. A method for controlling the flow of bulk objects on a vibratory dribble feeder of a weighing system and reducing the jamming of the bulk objects on the dribble feeder comprising the steps of:

a. providing and positioning an independently movable flexible cantilevered wiper over the dribble feeder a predetermined amount for wiping a portion of the bulk objects away from the dribble feeder, said wiper allowing a portion of the bulk objects to remain on the dribble feeder; and b. allowing the wiper to move to controlled independent predetermined amount in addition to being vibrated in order to prevent jamming of the bulk objects underneath the wiper.

9. An improved feeder unit for use in a weighing system, comprising:

a. a frame;

b. a vibratory bulk feeder fixedly attached to said frame for moving a large plurality of bulk objects along the bulk feeder;

c. a vibratory dribble feeder fixedly attached to said frame for moving a smaller plurality of bulk objects along the dribble feeder, said dribble feeder being positioned in close proximity to said bulk feeder;

d. an independently movable flexible cantilevered wiper mounted on said frame, and positioned above said dribble feeder for wiping a portion of the bulk objects from said dribble feeder into said bulk feeder, said independently movable wiper allowing a controlled portion of the bulk objects to remain on said dribble feeder, said independently movable wiper being movable an independent predetermined amount in order to prevent jamming, between said wiper and said dribble feeder, of the bulk objects that are to be left on said dribble feeder, said wiper also being vibrated independently by the vibratory feeder; and e. means, associated with said wiper for controlling the movement of said wiper during use of the feeder, said control means comprising a motor rotatably mounted to said wiper and further comprising said wiper being formed as a spiral wound brush which is rotatably mounted to that said motor controls the moving of said brush in order to aid in preventing jamming between said wiper and said dribble feeder of bulk objects that are to be left on said dribble feeder.

* * * * *

UNITED STATES PATENT OFFICE
CERTIFICATE OF CORRECTION

Patent No. 4,062,413　　　　　Dated December 13, 1977

Inventor(s) Michael S. Parker

It is certified that error appears in the above-identified patent and that said Letters Patent are hereby corrected as shown below:

Column 3, Line 33, delete "94" and insert in place thereof -- 95 --.
Column 4, Line 11, delete "by" and insert in place thereof -- of --.

Column 7, Line 36, after "1" insert -- inch --.
Column 7, Line 40, after "1" insert -- inch --.
Column 8, Line 11, delete "move to" and insert in place thereof -- move a --.
Column 8, Line 43, delete "to" and insert in place thereof -- so --.
Column 7, Line 34, after "3/4" insert -- inch --.
Column 7, Line 39, after "1/2" insert -- inch --.

Signed and Sealed this

Sixteenth Day of May 1978

[SEAL]

Attest:

RUTH C. MASON　　　　　LUTRELLE F. PARKER
Attesting Officer　　　Acting Commissioner of Patents and Trademarks